3,102,149
PURIFICATION OF PHENOL

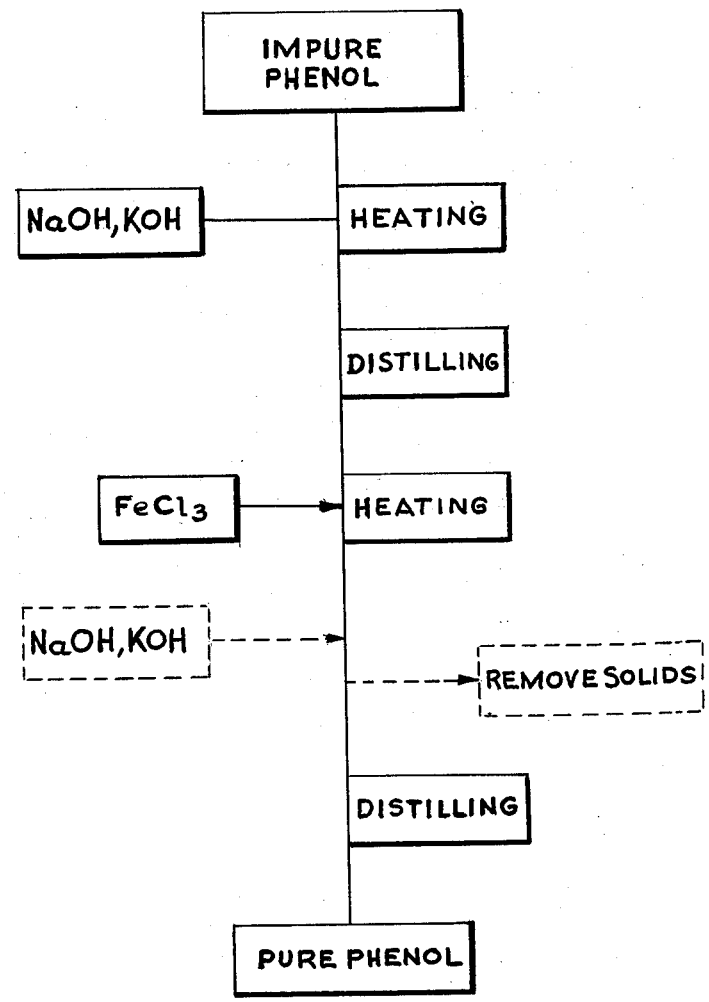

Sydney E. Barry, St. Laurent, Quebec, Canada, assignor, by mesne assignments, to Shawinigan Chemicals Limited, Montreal, Quebec, Canada, a corporation of Canada
Filed Dec. 7, 1959, Ser. No. 857,561
7 Claims. (Cl. 260—621)

The present invention relates to the purification of phenols, and in particular to the purification of phenol from the cumene oxidation process.

The phenol produced in this process, with conventional methods of purification, can meet the exacting requirements of the U.S. Pharmacopoeia or the British Standard Specification, but has been excluded from certain markets because it still contains traces of impurities. These impurities manifest themselves under various conditions: first, by the formation of intense colours, usually red, when the phenol is subjected to chlorination or sulphonation; second, by the formation of colour on storage of the phenol in the molten state, particularly when in contact with air and mild steel at elevated temperatures; and third, by undesirable colour formation in certain condensation products of the phenol, for example, bisphenol A. It is believed that different impurities or groups of impurities cause the formation of colour under these various conditions. Since different methods of purification may have varying effectiveness in removing the various impurities, a given method may be quite effective in reducing the formation of colour under one set of conditions, but may fail to reduce or may even increase the formation of colour under other conditions.

It has been proposed to treat impure phenol with inorganic halides, for example, boron fluoride, aluminium chloride, or zinc chloride. I have found, however, that ferric chloride is far superior to the chlorides specified in the prior art and that even the treatment with ferric chloride is not adequate to produce phenol of the required quality unless the phenol is treated with an alkali and then distilled before the treatment with ferric chloride. The distillation after the pretreatment with alkali is an essential part of the process.

According to the present invention the process for the primary purification of phenol derived from cumene by oxidation followed by cleavage of the resultant hydroperoxide, and containing colour-forming impurities, comprises heating the impure phenol with a substance selected from the group consisting of the hydroxides of sodium and potassium at a concentration of 0.025 to 0.25 pound moles per thousand pounds of phenol for a period of sixteen to forty-eight hours at a temperature of 95° to 170° C., and separating the phenol from the resultant mixture by distillation. The preferred treatment uses sodium hydroxide at a concentration of 0.4% by weight. The hydroxide used may be the dry substance or a strong aqueous solution, for example, a 50% solution.

There is some advantage in carrying out the hydroxide treatment of the preceding paragraph in the presence of iron, for example, 40 mesh powder at amounts between 0.2% and 0.5% by weight of the phenol. Even the relatively slight contact with iron afforded by carrying out the treatment in a mild steel vessel gives some advantage over treatment in glass.

Phenol so treated is not significantly improved, or may even be worse, with respect to formation of colour under the first condition noted above, but is much improved with respect to formation of colour under the second and third conditions.

Preferably, the phenol which has been subjected to this primary purification is subjected to secondary purification comprising heating it with 0.1% to 1.0% ferric chloride by weight for fourteen days to eight hours at a temperature between the melting point of phenol and 80° C., preferably at 60° to 75° C., followed by the separation of the phenol by distillation, preferably at reduced pressure, for example at 50 to 250 mm. of mercury. The longer times of treatment are used with the lower concentrations of ferric chloride. Anhydrous or hydrated ferric chloride may be used but the water content of the mixture for this secondary purification, including that from the hydrate, should be below 1.0%; anhydrous ferric chloride and a water content of the mixture below 0.2% are preferred. To produce phenol of given quality, the higher the water content, the higher the concentration of ferric chloride required, or the longer the time of treatment required.

This procedure is quite satisfactory for use in glass apparatus but in order to reduce the risk of corrosion of plant equipment it is preferable to add to the phenol, after the treatment with the chloride, about three moles of an alkali selected from the group consisting of the hydroxides of sodium and potassium per mole of chloride, before separating the phenol by distillation. It is not necessary to remove the solids which precipitate when the hydroxide is added to the phenol, but to avoid fouling of heat-transfer surfaces it is preferable to do so before the distillation, for example by means of a filter or centrifuge.

Phenol which has been subjected to these primary and secondary purifications is markedly improved with respect to formation of colour under the first conditions noted above, and is equal to or better than the phenol which has undergone only the primary treatment with respect to the formation of colour under the second and third conditions.

The diagrammatic flow sheet of the drawing shows the primary and secondary purifications.

The starting material for the process of the present invention may be crude phenol, produced by the cleavage of cumene hydroperoxide, or the phenol which has already been purified to a degree which satisfies the requirements of the U.S. Pharmacopoeia or the British Standard Specification, but which still contains traces of colour-forming impurities. It is preferred to use phenol which has been obtained from the neutralized and desalted product of cleavage, by fractional distillation for the removal of most of the lower boiling materials, such as acetone, cumene, and alpha-methyl styrene, and most of the higher boiling materials, such as acetophenone and dimethyl benzyl alcohol.

The tests for determining the effectiveness of the various treatments are described below.

*Diluted Chlorination Colour (DCC).*—Chlorine gas is bubbled into 50 grams of molten phenol held at about 85° C. until its weight increases to 70 grams which roughly corresponds to the monochlor stage. 25 grams of the chlorinated product are added to 100 mls. of ethanol. The DCC is defined as the absorbance of this solution as measured on a spectrophotometer at wavelength 496 millimicrons (m$\mu$) in Pyrex cells with a light-path of 10 mm., corrected for a blank of the diluent ethanol in a matching cell.

*Visual Chlorination Colour (VCC).*—The colour of the phanol chlorinated as in the DCC test but not diluted is referred to as the VCC.

*Sulphonation Colour (SC).*—Two parts of phenol are mixed with one part of concentrated sulphuric acid and maintained at 150° C. for five minutes and cooled. The SC is defined as the absorbance of this solution as measured on a spectrophotometer at wavelength 490 millimicrons (m$\mu$) in Pyrex cells with a light-path of 10 mm., corrected for a blank consisting of a water-white mixture of two parts of purified phenol and one part of concentrated sulphuric acid, in a matching cell.

*Storage Colour Stability (SCS).*—Samples of phenol are stored at 65° C. in small glass containers open to the air through a vent condenser and also containing a clean tube of mild steel. The colour is measured at suitable intervals in units as prescribed by the American Public Health Association (A.P.H.A.). The SCS is defined as the increase in A.P.H.A. colour units per day.

*Bisphenol Colour (BC).*—Bisphenol A was made from the phenol under test by the process described in Canadian Patent 476,865. The Bisphenol Colour is defined as the A.P.H.A. colour of solutions of the resultant bisphenol A at a concentration of 5 grams in 100 ml. of ethanol.

EXAMPLE 1

Sodium hydroxide at 0.6% by weight (dry basis) was added as a 50% aqueous solution to a sample of molten cumene-made phenol and thoroughly mixed. The phenol was held at 140° C. for thirty-two hours and then fractionally distilled. The Storage Colour Stability (SCS) and the Bisphenol Colour (BC) were much better than the same phenol given the same distillation without the caustic soda treatment as shown in Table I.

*Table I*
REDUCTION OF SCS AND BC BY SODIUM HYDROXIDE

| NaOH | SCS | BC |
| --- | --- | --- |
| None | 200 | 70 |
| 0.6% | 10 | 6 |

EXAMPLE 2

To the distilled phenol from Example 1 (containing 0.10% water by weight) was added 1.0% by weight of anhydrous ferric chloride, which was mixed by pump circulation. The mixture was held at 67° C. for thirty-five hours; then caustic soda flakes (0.74% by weight on the phenol) were added and mixed by circulation. The mixture was fed to the boiler of a distillation column operating at a pressure of about 150 mm. mercury; the phenol was taken off as the overhead product. Table II shows the test data.

*Table II*
REDUCTION OF VCC, DCC, AND SC BY FERRIC CHLORIDE

| Sample | VCC | DCC | SC |
| --- | --- | --- | --- |
| Original phenol (Product of Ex. 1) | intensely deep red. | 3.34 | 21 |
| Final phenol | light yellow-orange. | 0.037 | 0.36 |

EXAMPLE 3

A sample of cumene-made phenol containing 0.08% water (a different sample from that used in Example 1) was heated with 0.8% by weight of sodium hydroxide for sixteen hours at 150° C. and then goosenecked off under a medium vacuum. Following this primary treatment, the phenol was heated with anhydrous ferric chloride at 0.8% by weight for sixteen hours at 65° C., 0.59% by weight of sodium hydroxide was then added and the phenol was goosenecked off under a medium vacuum. Table III shows the test data.

*Table III*
EFFECT OF CAUSTIC AND FERRIC CHLORIDE TREATMENTS ON VCC AND DCC

| Sample | VCC | DCC |
| --- | --- | --- |
| Initial | intensely red | 1.01 |
| After primary treatment | do | 1.58 |
| After both treatments | pale yellow | 0.018 |

EXAMPLE 4

A sample of cumene-made phenol (a different sample from those used in other examples) was treated with caustic soda and distilled, as in Example 1. Two portions of the phenol so treated were each heated with ferric chloride hexahydrate (1% ferric chloride, dry basis, by weight), and held at 65° C. for forty and one hundred and twelve hours respectively. The water content, including that from the hydrated ferric chloride, was 0.73% by weight of the phenol. Sodium hydroxide (caustic soda) was then added to the portions treated with ferric chloride and the phenol was distilled off; these two steps being carried out as in Example 2. Table IV shows the test data.

*Table IV*
USE OF FERRIC CHLORIDE HEXAHYDRATE

| Sample | VCC | DCC |
| --- | --- | --- |
| Initial | deep red | 0.950 |
| After primary treatment | do | 1.13 |
| After secondary treatment: | | |
| 40 hours | orange | 0.091 |
| 112 hours | light orange | 0.055 |

EXAMPLE 5

A sample of cumene-made phenol (a different sample from those used in other examples) was treated with caustic soda and distilled as in Example 1. Various portions of the phenol so treated (containing 0.12% water by weight) were each held at 72° C. with anhydrous ferric chloride at various concentrations and times. Equivalent amounts of sodium hydroxide (three moles per mole of chloride) were then added to each sample, and the resultant mixtures were distilled at 100 mm. mercury pressure. Table V shows the Diluted Chlorination Colour (DCC) of the distillate for each combination of concentrations and time including the blank which received only the preliminary caustic treatment and distillation.

*Table V*
EFFECT OF TIME AND CONCENTRATION OF FERRIC CHLORIDE TREATMENT

| Ferric Chloride, percent | Time, Hrs. | DCC absorbance |
| --- | --- | --- |
| 0 | 0 | 0.910 |
| 0.10 | 306 | 0.041 |
| 0.25 | 40 | 0.084 |
|  | 112 | 0.050 |
|  | 160 | 0.037 |
|  | 232 | 0.031 |
| 0.50 | 40 | 0.062 |
|  | 64 | 0.050 |
| 0.75 | 112 | 0.027 |
|  | 64 | 0.035 |
| 1.0 | 16 | 0.054 |
|  | 44 | 0.037 |

EXAMPLE 6

A sample of cumene-made phenol (a different sample from those used in other examples) was treated with caustic soda and distilled as in Example 1. Portions of the distilled phenol containing 0.11% water by weight were each heated with anhydrous ferric chloride at 1.0% by weight of the charge for twenty hours at the listed temperatures. Fifty percent aqueous caustic soda was then added to provide ten percent excess over three moles of caustic per mole of chloride. The phenol was distilled off each mixture at about 100 mm. mercury pressure, after the initial wet fraction was taken. Table VI shows the Visual Chlorination Colour (VCC) and the Diluted Chlorination Colour (DCC) for each distillate and the blank which received only the preliminary caustic treatment and distillation.

Table VI

EFFECT OF TEMPERATURE OF FERRIC CHLORIDE TREATMENT

| Temp., °C. | VCC | DCC |
|---|---|---|
| Blank | intensely red | 3.13 |
| 45 | orange | 0.064 |
| 65 | light orange-yellow | 0.037 |
| 70 | ----do---- | 0.032 |
| 72.5 | light yellow | 0.025 |
| 75 | pale yellow | 0.023 |
| 77.2 | light orange-yellow | 0.035 |
| 80 | orange | 0.057 |
| 85 | ----do---- | 0.097 |
| 130 | orange-amber | 0.180 |

EXAMPLE 7

Sodium hydroxide, 0.8% by weight, was added to a sample of molten cumene-made phenol with a Diluted Chlorination Colour (DCC) value of 1.013 and thoroughly mixed. The mixture was held at 150° C. for thrity-two hours. The phenol distilled from the mixture at 100 mm. mercury pressure had a DCC value of 1.217.

Samples of the original phenol (containing 0.08% water by weight) and of the phenol treated as in the preceding paragraph (containing 0.09% water by weight) were heated with 0.8% by weight of anhydrous aluminium chloride and anhydrous ferric chloride, respectively, for sixteen hours at 65° C., and then goosenecked off at 100 mm. mercury pressure. The observations of the Visual Chlorination Colour (VCC) and Diluted Chlorination Colour (DCC) tests are shown in Table VII.

Table VII

COMPARISON OF ALUMINIUM AND FERRIC CHLORIDES

| Caustic Treatment | Chloride Trearment | VCC | DCC |
|---|---|---|---|
| None | None | deep red | 1.013 |
| 0.8% | None | ----do---- | 1.217 |
| None | AlCl₃ | intensely red | 2.05 |
| 0.8% | AlCl₃ | orange-red | 0.261 |
| None | FeCl₃ | orange | 0.235 |
| 0.8% | FeCl₃ | light yellow | 0.037 |

EXAMPLE 8

A sample of cumene-made phenol (a different sample from those used in other examples) was treated with caustic soda and distilled as in Example 1 except that the concentration was 0.58% by weight. Portions of the distilled phenol containing 0.11% water by weight were heated with dry zinc chloride, dry stannic chloride, and dry ferric chloride, respectively, at 0.8% by weight of the phenol for sixteen hours at 65° C. Fifty percent aqueous caustic soda was then stirred in at an amount to provide ten percent excess over two, four, and three moles of caustic per mole of zinc, stannic, and ferric chloride, respectively. The phenol was goosenecked off each mixture at 100 mm. mercury pressure after the initial wet fraction was taken. The observations of the Visual Chlorination Colour (VCC) and the tests of the Diluted Chlorination Colour (DCC) are shown for the various phenol distillates; in addition they were analyzed by ultra-violet spectroscopy for 2-methyl benzofuran (2MBF), a known strong chlorination-colour-forming impurity. Table VIII shows the test data.

Table VIII

COMPARISON OF ZINC, TIN, AND FERRIC CHLORIDES

| Chloride Treatment | VCC | DCC | 2-MBF, p.p.m. |
|---|---|---|---|
| None | dark red | 1.47 | 372 |
| ZnCl₂ | deep red | 1.332 | 378 |
| SnCl₄ | red | 0.479 | 81 |
| FeCl₃ | orange | 0.141 | none |

What is claimed is:
1. A process for the purification of phenol derived from cumene by oxidation followed by cleavage of the resultant hydroperoxide, and containing colour-forming impurities, consisting of heating the impure phenol with a substance selected from the group consisting of the hydroxides of sodium and potassium at a concentration of 0.025 to 0.25 pound moles per thousand pounds of phenol for a period of sixteen to forty-eight hours at a temperature of 95° to 170° C., distilling the phenol from the resultant mixture, heating the phenol distillate with 0.1 to 1.0% ferric chloride by weight for fourteen days to eight hours at temperatures between the melting point of phenol and 80° C., and distilling substantially anhydrous purified phenol from the mixture of phenol and ferric chloride, the water content of said mixture being less than 1.0% by weight.

2. A process as claimed in claim 1 in which, after the treatment of the phenol with the chloride, about three moles of an alkali selected from the group consisting of the hydroxides of sodium and potassium per mole of chloride are added to the phenol before the distillation.

3. A process for the purification of phenol derived from cumene by oxidation followed by cleavage of the resultant hydroperoxide, and containing colour-forming impurities, consisting of heating the impure phenol with a substance selected from the group consisting of the hydroxides of sodium and potassium at a concentration of 0.025 to 0.25 pound moles per thousand pounds of phenol for a period of sixteen to forty-eight hours at a temperature of 95° to 170° C., distilling the phenol from the resultant mixture, heating the phenol distillate with 0.1 to 1.0% ferric chloride by weight for fourteen days to eight hours at temperatures between the melting point of the phenol and 80° C., adding about three moles of an alkali selected from the group consisting of the hydroxides of sodium and potassium per mole of chloride, removing the solids thus precipitated, and distilling substantially anhydrous purified phenol from the mixture of phenol and ferric chloride, the water content of said mixture being less than 1.0% by weight.

4. A process as claimed in claim 3 in which the treatment with ferric chloride is carried out at temperatures between 60° and 75° C.

5. A process as claimed in claim 3 in which the ferric chloride used is anhydrous and the water content of the mixture of phenol and ferric chloride is less than 0.2% by weight.

6. A process as claimed in claim 3 in which the ferric chloride used is the hexahydrate salt and the concentration of ferric chloride on the dry basis lies between 0.5 and 1.0% by weight.

7. A process as claimed in claim 3 in which the final distillation is carried out at an absolute pressure of 50 to 250 mm. of mercury.

References Cited in the file of this patent

UNITED STATES PATENTS

| | | |
|---|---|---|
| 2,446,250 | Shuman | Aug. 3, 1948 |
| 2,529,209 | Ayo et al. | Nov. 7, 1950 |
| 2,992,169 | Gregory et al. | July 11, 1961 |
| 3,029,292 | Nixon | Apr. 10, 1962 |